US008648587B2

(12) United States Patent
Brueckl et al.

(10) Patent No.: US 8,648,587 B2

(45) Date of Patent: Feb. 11, 2014

(54) ARRANGEMENT OF A STEPPING SWITCH ON A CONTROL TRANSFORMER

(75) Inventors: Oliver Brueckl, Waldmuenchen (DE); Dieter Dohnal, Lappersdorf (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 28 days.

(21) Appl. No.: 13/380,602

(22) PCT Filed: May 8, 2010

(86) PCT No.: PCT/EP2010/002820

§ 371 (c)(1), (2), (4) Date: Jan. 24, 2012

(87) PCT Pub. No.: WO2011/012181

PCT Pub. Date: Feb. 3, 2011

(65) Prior Publication Data

US 2012/0112730 A1 May 10, 2012

(30) Foreign Application Priority Data

Jul. 30, 2009 (DE) ........................ 10 2009 035 699

(51) Int. Cl.

*H02J 3/12* (2006.01)

(52) U.S. Cl.

USPC ........... 323/328; 323/340; 323/343; 323/345; 323/347

(58) Field of Classification Search

USPC .......................... 323/328, 340, 343, 345, 347

See application file for complete search history.

(56) References Cited

U.S. PATENT DOCUMENTS

| | | | | |
|---|---|---|---|---|
| 6,856,122 | B2 * | 2/2005 | Dohnal et al. | 323/258 |
| 7,145,760 | B2 * | 12/2006 | Stenestam et al. | 361/115 |
| 7,317,598 | B2 * | 1/2008 | Magnier | 361/37 |
| 7,869,167 | B2 * | 1/2011 | Wakchaure | 361/36 |
| 2004/0032699 | A1 * | 2/2004 | Dohnal et al. | 361/38 |
| 2005/0099741 | A1 * | 5/2005 | Stenestam et al. | 361/1 |
| 2011/0063064 | A1 * | 3/2011 | Albrecht et al. | 336/94 |

FOREIGN PATENT DOCUMENTS

| | | | |
|---|---|---|---|
| DE | 758825 | B | 11/1952 |
| DE | 912366 | B | 5/1954 |
| DE | 922003 | B | 1/1955 |
| DE | 10055406 | B | 4/2002 |

* cited by examiner

*Primary Examiner* — Bao Q Vu

(74) *Attorney, Agent, or Firm* — Andrew Wilford

(57) ABSTRACT

The invention relates to the arrangement of a stepping switch on a control transformer, wherein either only the mechanical contact system (8) of the stepping switch or also its load changeover switch (7) is or are arranged within the tank (1) of the transformer, under the transformer cover (4) and above the iron yoke (3).

1 Claim, 1 Drawing Sheet

ARRANGEMENT OF A STEPPING SWITCH ON A CONTROL TRANSFORMER

CROSS REFERENCE TO RELATED APPLICATIONS

Figure 1:
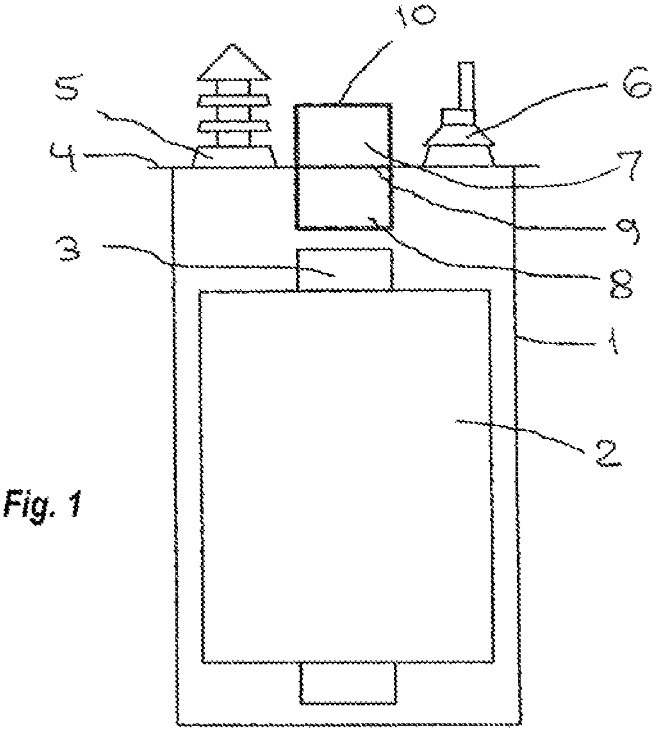

This application is the US-national stage of PCT application PCT/EP2010/002820 filed 8 May 2010, published 3 Feb. 2011 as WO2011/012181, and claiming the priority of German patent application 102009035699.1 itself filed 30 Jul. 2009, whose entire disclosures are herewith incorporated by reference.

The invention relates to the arrangement of a tap changer, particularly an electronic tap changer, at a regulating transformer, particularly a distributing transformer.

Tap changers serve for uninterrupted switching over between winding taps of a regulating transformer. They have been state of the art for many years and are known in numerous forms of embodiment with mechanical contacts or vacuum switching tubes or also semiconductor switches as switching elements for on-load switching over.

The various known arrangements of a tap changer at or in the transformer are known from the publication Kramer: 'On-Load Tap-Changer for Power Transformers', MR Publication, 2000, page 6. In the case of the so-called 'in-tank type' (built-in switch) the tap changer is located completely recessed in the transformer vessel laterally adjacent to the windings of the transformer and is surrounded by the oil volume thereof. Depending on the constructional form, the load changeover switch or also the completely embedded tap changer has a separate oil volume. In the case of the so-called 'compartment type' (attached switch) the tap changer is arranged laterally at the transformer vessel and is connected with the regulating winding by way of lead-throughs. The laterally attached tap changer usually has a separate oil volume. A tap changer with at least one switch-over resistance and semiconductor switching elements is known from DE 101 02 310 C1, wherein only the tap selector is accommodated in the oil-filled transformer vessel, whilst the actual load changeover switch with thyristors as semiconductor switching elements is located in air in a laterally attached separate housing. The switch-over resistance is in turn arranged in air in a further lateral separate housing part.

A disadvantage with the known arrangements of the tap changer in the transformer or laterally at the transformer is a necessary correspondingly wider or longer transformer mode of construction. Especially in the case of distributor transformers or local mains transformers such a correspondingly wider or longer transformer mode of construction encompassing the space for the tap changer would lead to correspondingly larger compact stations. However, this is undesirable, since larger compact stations are correspondingly more expensive and, above all, also demand more installation space.

It is therefore the object of the invention to provide an arrangement of a tap changer at a regulating transformer which does not increase the area predetermined by the transformer and overall allows an efficient, space-saving and economic integration of the tap changer with a regulating transformer.

This object is fulfilled by an arrangement with the features of the first claim. The subclaims relate to advantageous developments of the invention.

The invention is based generally on the idea of providing a tap changer above the yoke of the regulating transformer and thus entirely above at or in the regulating transformer. This is particularly advantageous in the case of compact stations which usually offer sufficient space at the top. Particularly in the case of such compact stations a smallest possible installation space is desired so as to keep the necessary acquisition of land for installation as small as possible. By contrast, the height of the compact stations installed on the corresponding area does not influence these costs.

According to a first form of embodiment of the invention the mechanical contact system of the tap changer is located below the transformer cover and thus within the transformer, whereagainst the actual load changeover switch is located above the transformer cover and thus outside the transformer.

According to a further form of embodiment of the invention the complete tap changer, i.e. not only the mechanical contact system, but also the load changeover switch, is disposed below the transformer cover and thus within the transformer.

It is particularly advantageous to separate the mechanical contact system and the load changeover switch from one another by an insulating lead-through plate.

Moreover, it is advantageous within the scope of the invention to provide the load changeover switch as an electronic power load changeover switch with electronic switching means such as thyristors or IGBTs.

In an embodiment with such an electronic power load changeover switch and a separation of the mechanical contact system by the mentioned insulating lead-through plate the electronic components can thus be operated in air and the mechanical contact system, thereagainst, in oil, the preferred ambient media thereof.

In particularly advantageous manner a separate cover is provided so that the electronic power load changeover switch is readily separately accessible from above.

Figure 2:
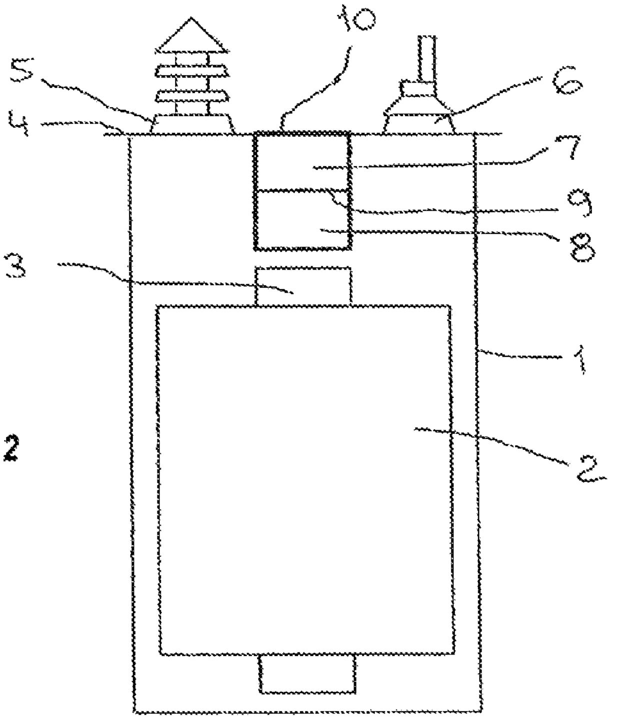

The invention will be explained in more detail in the following by way of exemplifying embodiments, in which:

FIG. 1 shows a first form of embodiment of an arrangement according to the invention and FIG. 2 shows a second form of embodiment of an arrangement according to the invention.

A vessel 1 in a regulating transformer, in the interior of which windings 2 and at least one yoke 3 are disposed, is shown in FIG. 1 in schematic illustration. The vessel 1 is closed at the top by a transformer cover 4. The complete vessel 1 is usually oil-filled. The MS lead-through 5 and the NS lead-through 6 are, in addition, schematically shown above the transformer cover 4. The connection with the primary side or secondary side of the winding 2 in the interior of the transformer and the electrical connections from the regulating winding to the tap changer are not shown. Arranged above the yoke 3 is a tap changer which comprises an electronic load changeover switch 7 and a mechanical contact system 8 thereunder, thus the selector. The load changeover switch 7 and contact system 8 are hermetically separated from one another by a horizontal lead-through plate 9. The electrical connections from the two parts of the tap changer via the lead-through plate 9 are again not illustrated. The housing of the tap changer has at the top a cover 10 to be opened separately. It can be seen that in this form of embodiment the electronic load changeover switch 7 is located above the transformer cover 4, whilst the mechanical contact system 8 is located within the transformer, i.e. below the transformer cover 4.

FIG. 2 shows a further form of embodiment of the invention, in which, in departure from the previously described solution, both the electronic load changeover switch 7 and the mechanical contact system 8 are arranged below the transformer cover 4 and thus in the vessel 1.

In both forms of embodiment it is ensured through the arrangement of the tap changer above the yoke 3 that the necessary area for the arrangement is determined exclusively by the dimensioning of the winding 2 and the size of the vessel 1 resulting therefrom. By contrast, in accordance with the invention the tap changer does not need any additional installation area.

As already mentioned, this advantage of minimized installation area is particularly significant for distributing transformers in corresponding compact stations. The invention operates in advantageous manner with an electronic load changeover switch comprising electronic power switching elements.

The invention claimed is:

1. A combination of a tap changer at a regulating transformer, wherein the tap changer comprises a mechanical contact system for selection of a tap of a regulating winding of the regulating transformer as well as a load changeover switch for actual on-load switching, the regulating transformer comprises an oil-filled vessel in which at least one yoke and windings of the regulating transformer are disposed, the vessel is closed at the top by a transformer cover, the mechanical contact system of the tap changer is in the vessel below the transformer cover and above the yoke, the load changeover switch is outside the vessel above the transformer cover, the load changeover switch and mechanical contact system of the tap changer are separated from one another by a horizontal insulating lead-through plate, the load changeover switch comprises thyristors or IGBTs for uninterrupted on-load switching over, and the regulating transformer is a local mains transformer or a consumer-proximal distributing transformer.

* * * * *